Figure 3:
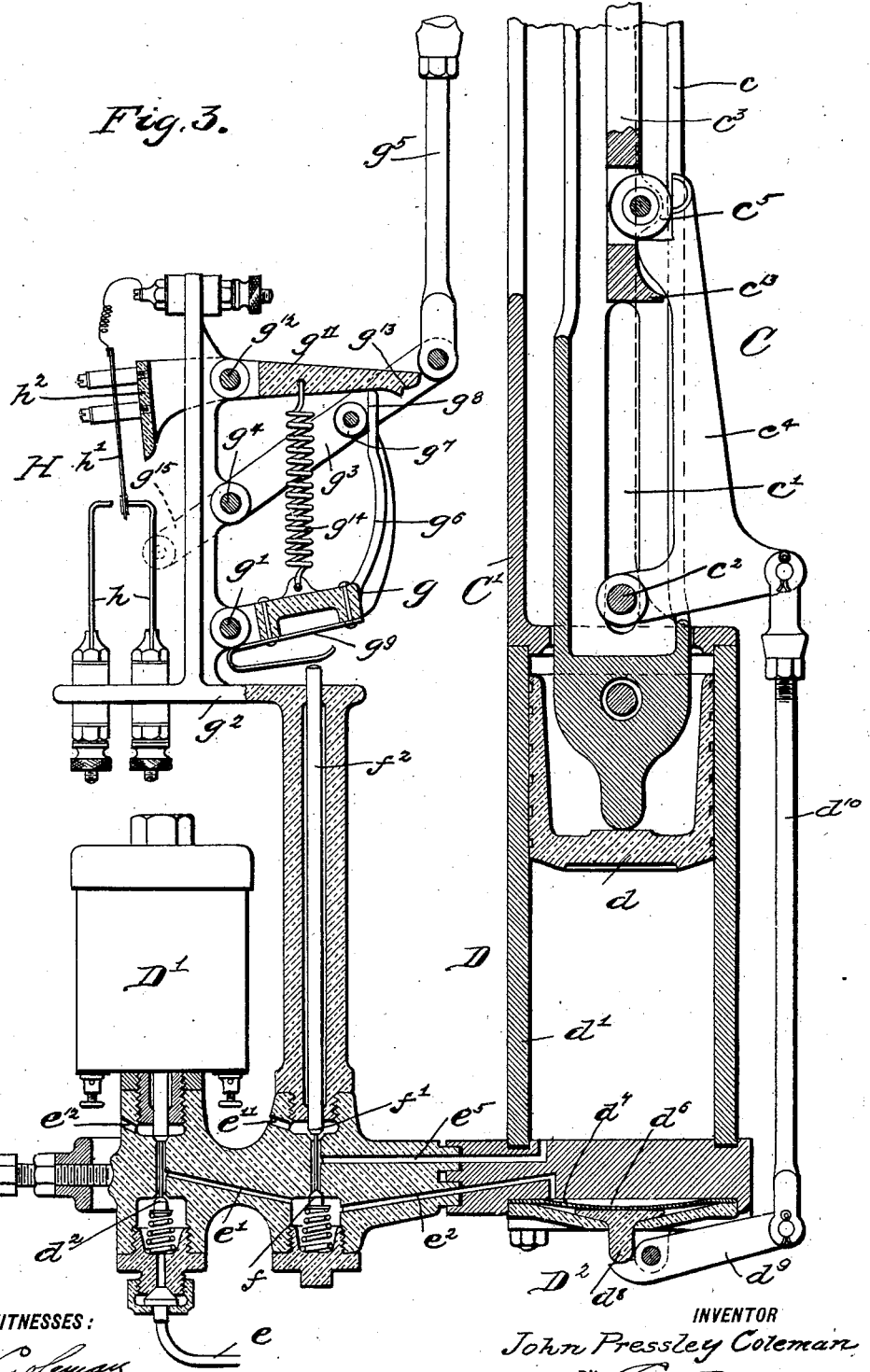

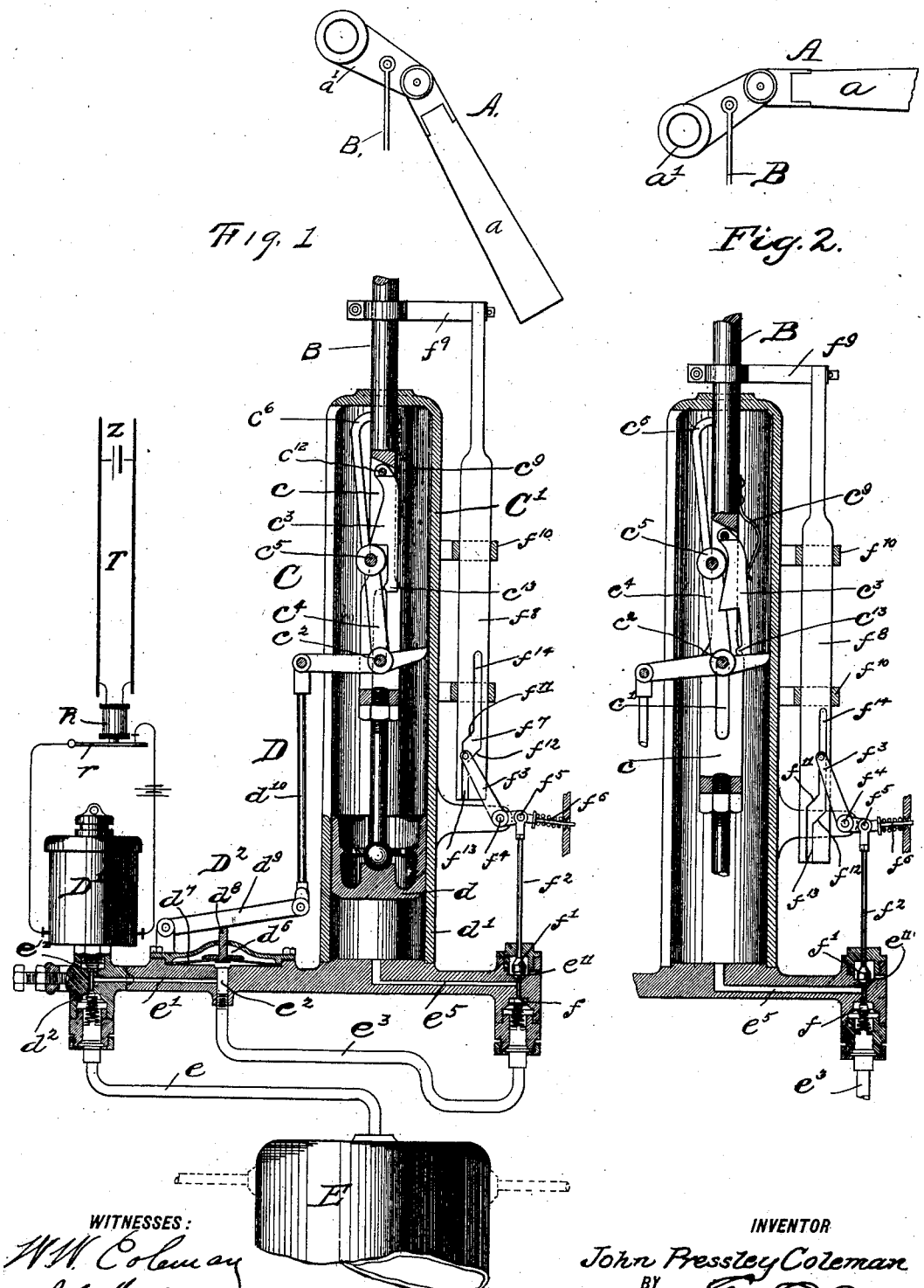

No. 745,309. PATENTED NOV. 24, 1903.
J. P. COLEMAN.
RAILWAY SIGNAL.
APPLICATION FILED DEC. 10, 1902.
NO MODEL. 5 SHEETS—SHEET 2.

WITNESSES:

INVENTOR
John Pressley Coleman
BY
HIS ATTORNEY

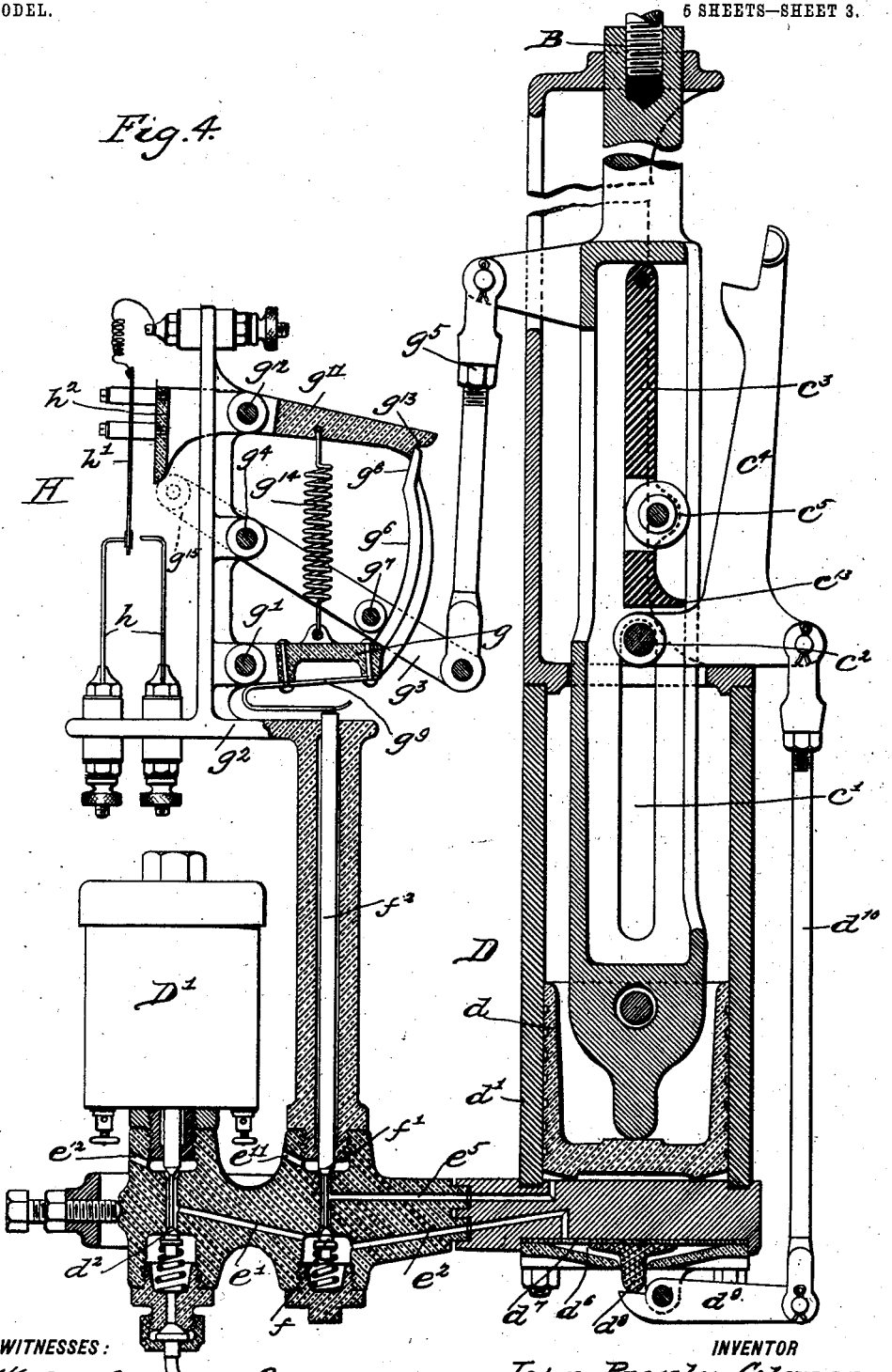

No. 745,309. PATENTED NOV. 24, 1903.
J. P. COLEMAN.
RAILWAY SIGNAL.
APPLICATION FILED DEC. 10, 1902.
NO MODEL. 5 SHEETS—SHEET 4.
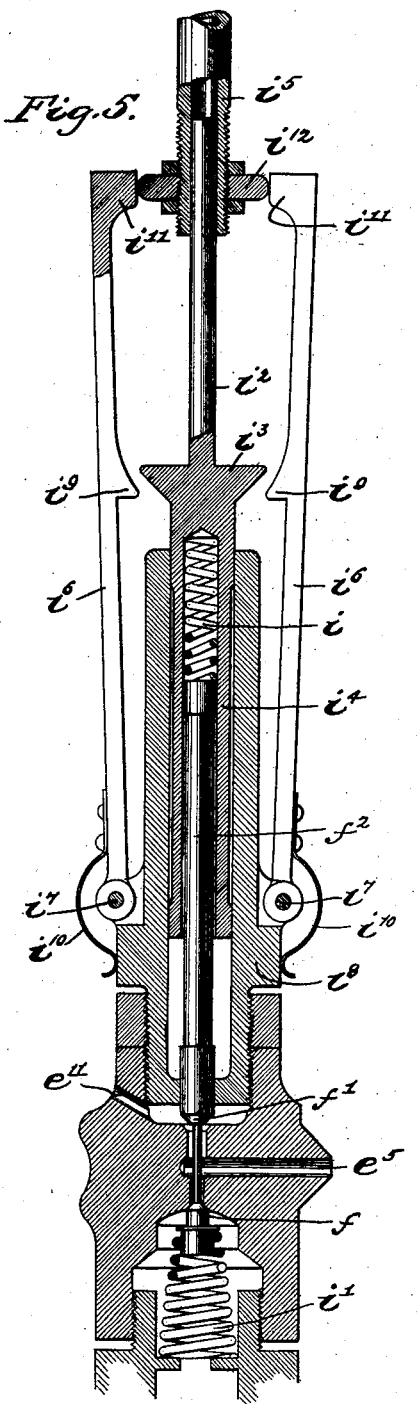
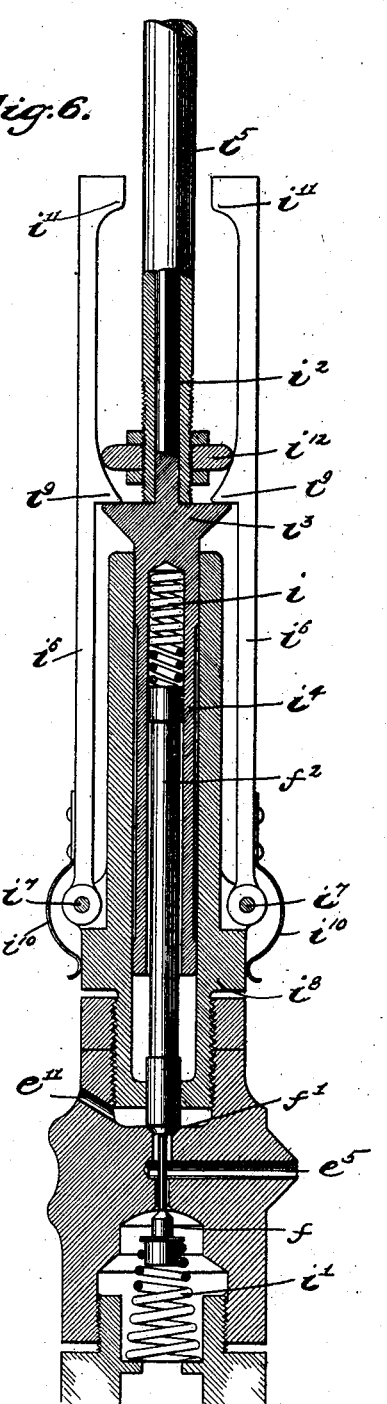
WITNESSES:
W. W. Coleman
J. J. Hobson
INVENTOR
John Pressley Coleman
BY Geo. E. Cruse
HIS ATTORNEY
THE NORRIS PETERS CO., PHOTO-LITHO., WASHINGTON, D. C.

No. 745,309. PATENTED NOV. 24, 1903.
J. P. COLEMAN.
RAILWAY SIGNAL.
APPLICATION FILED DEC. 10, 1902.
NO MODEL. 5 SHEETS—SHEET 5.
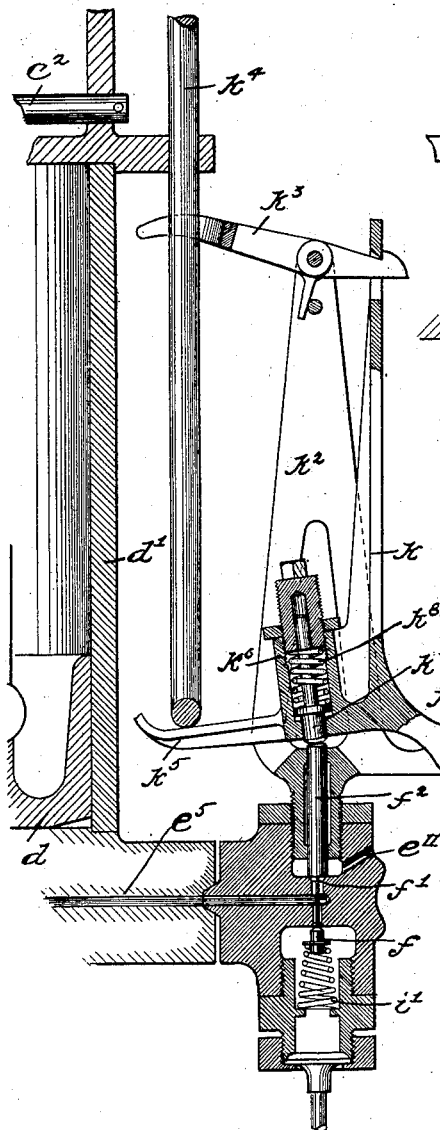
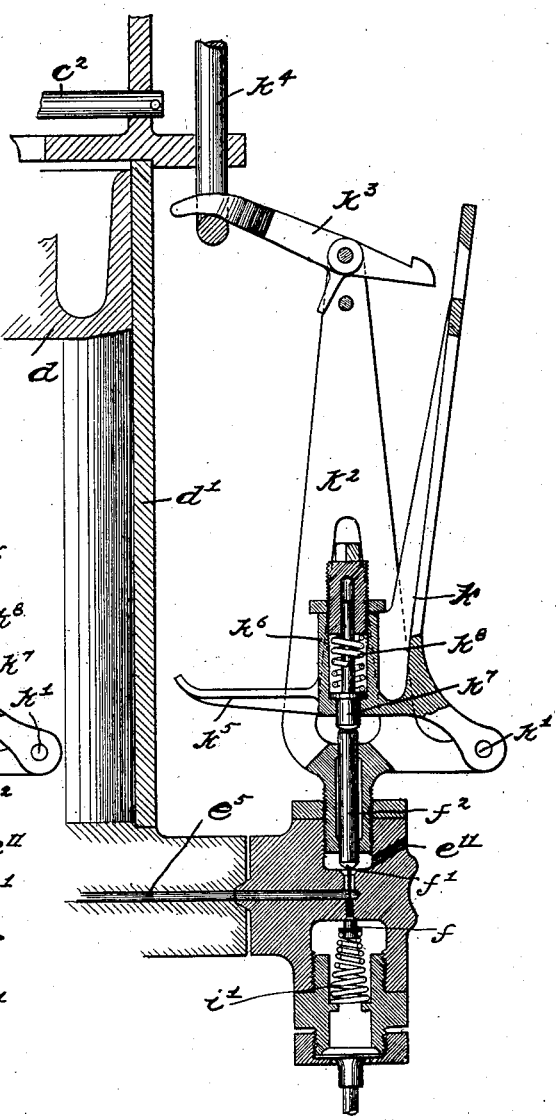
WITNESSES:
INVENTOR
John Pressley Coleman
BY
HIS ATTORNEY No. 745,309. Patented November 24, 1903.

UNITED STATES PATENT OFFICE.

JOHN PRESSLEY COLEMAN, OF EDGEWOOD, PENNSYLVANIA, ASSIGNOR TO THE UNION SWITCH AND SIGNAL COMPANY, OF SWISSVALE, PENNSYLVANIA, A CORPORATION OF PENNSYLVANIA.

RAILWAY-SIGNAL.

SPECIFICATION forming part of Letters Patent No. 745,309, dated November 24, 1903.

Application filed December 10, 1902. Serial No. 134,656. (No model.)

*To all whom it may concern:*

Be it known that I, JOHN PRESSLEY COLEMAN, a citizen of the United States, residing at Edgewood, in the county of Allegheny and State of Pennsylvania, have invented certain new and useful Improvements in Railway-Signals, of which the following is a specification.

My invention relates to railway-signals, and particularly to that class of railway-signals in which the motive power therefor is in the form of fluid-pressure.

I will describe a railway-signal embodying my invention, together with several modifications, and then point out the novel features thereof in claims.

In the accompanying drawings, Figure 1 is a view, partly in elevation and partly in vertical section, of a railway-signal embodying my invention, the several parts therein being shown in the positions they occupy when the signal device is in a position indicating "clear" or "safety." Fig. 2 is a view, partly in elevation and partly in vertical section, of certain parts shown in Fig. 1 in the positions they occupy when the signal device is in a position indicating "danger" or "caution." Fig. 3 is a view, partly in elevation and partly in vertical section, of a modified form of railway-signal embodying my invention, the several parts being shown in the positions they occupy when the signal device is in a position indicating "clear" or "safety." Fig. 4 is a view similar to Fig. 3 and of the same railway-signal, but showing the parts in the positions they occupy when the signal device is in a position indicating "danger" or "caution." Fig. 5 is a detail vertical sectional view showing another modification, the several parts being in the positions they occupy when the signal device is in a position indicating "clear" or "safety." Fig. 6 is a view similar to Fig. 5 and of the same parts, but showing them in the positions they occupy when the signal device is in a position indicating "danger" or "caution." Fig. 7 is a detail vertical sectional view showing another modification, the several parts being shown in the positions they occupy when the signal device is in a position indicating "clear" or "safety." Fig. 8 is a view similar to Fig. 7 and of the same parts, but showing them in the positions they occupy when the signal device is in a position indicating "danger" or "caution."

Similar letters of reference designate corresponding parts in all of the figures.

I will premise that wherever I herein use the term "signal" I mean to include any visual signal device which by its color or by its position relatively to its support gives indication of the service condition of the railroad-track or section of railroad-track which it governs; also, wherever I herein use the term "fluid-pressure" I mean a liquid or gas under pressure. I preferably employ a gas. Any gas may be employed—as, for example, air or carbonic-acid gas and under any pressure which is sufficient or more than sufficient to operate the apparatus or mechanism employed for moving the signal device. If the pressure of the gas is above that required for the operation of the apparatus or mechanism employed to move the signal device, reducing-valves may be employed in their proper places.

Referring now to the drawings, A designates a visual signal device, here shown as being of the semaphore type and comprising, as usual, a blade $a$ and a counterweight $a'$, which is adapted to move the blade to one position of indication, generally to a horizontal position of indication, when the signal device is free to move—that is, when the signal device is not held in a clear or safety position by any means or agency. The signal device is therefore biased to one position of indication, generally to the horizontal position of indication, which position indicates "danger" or "caution." The signal device is pivoted, as usual, on a post or other support, and it is moved from one position of indication to another, generally from a horizontal position to a position indicating "clear" or "safety," through the agency of a rod B. One end of the rod is operatively connected with the signal device, and the other end is operatively connected with the fluid-pressure mechanism or apparatus which is designed to move the signal device from one position of indication to another.

D designates the fluid-pressure mechanism or apparatus for moving the signal device from one position of indication to another. It is here shown as being in the form of a motor consisting of a piston $d$ and a cylinder $d'$, within which the piston moves. Fluid-pressure for operating the mechanism is here shown as being supplied from a tank or reservoir E, which may be of any size or capacity, or there may be a plurality of such tanks or reservoirs. The pressure of the gas in the tank or reservoir may be maintained in any desired manner. In the case of carbonic-acid gas or any other similar gas being employed to operate the fluid-pressure mechanism it is preferable that the tank or reservoir be separately charged and afterward connected with the fluid-pressure mechanism. Instead, however, a charging pipe or pipes (see dotted lines, Fig. 1) may be connected with the tank or reservoir and the gas under pressure supplied to the tank or reservoir through said pipe or pipes from any suitable source. Any number of individual tanks or reservoirs may be supplied with the fluid-pressure from a single source through one or a number of pipe-lines. The fluid-pressure passes from the tank E to the fluid-pressure mechanism through a pipe or conduit $e$, and its passage through the pipe $e$ is under the control of an electrically-operated valve device D'. This valve device may conveniently be substantially of the form and arrangement illustrated and described in United States Patent No. 357,109, issued February 1, 1887, to George Westinghouse, Jr., for electrical interlocking mechanism for switches and signals, to which patent reference may be had for details of construction and operation. It is only necessary to here state that the electrically-operated valve device should have the functions of opening the supply of fluid-pressure when the magnet comprised in the device is energized and of closing or cutting off this supply of fluid-pressure when said magnet is deënergized and of opening an exhaust port or passage through which the used fluid-pressure may escape to the atmosphere. Any electrically-operated valve device having these functions may be employed. The fluid-pressure passes around the valve $d^2$, comprised in the valve device D', and through a passage or conduit $e'$ to a port $e^2$, which communicates with a second fluid-pressure mechanism, to be hereinafter referred to. A pipe or conduit $e^3$ is also in communication with the port $e^2$, and the fluid-pressure also passes through this pipe and past one part of a double valve $f$ through a passage or conduit $e^5$ to the cylinder of the fluid-pressure mechanism D.

In this invention the fluid-pressure mechanism D is designed only to move the signal device from one position of indication to another, preferably from the danger position to the clear position. This is accomplished by a single stroke of the piston of the fluid-pressure mechanism. After the signal device has been moved by the fluid-pressure mechanism I employ means for locking the signal device in the position to which it has been moved, thereby permitting the fluid-pressure to be cut off from the fluid-pressure mechanism employed for moving the signal device. In this invention I cut off the supply of fluid-pressure by the valve $f$, which is operated positively and mechanically from a movable part comprised in the railway-signal. Whenever it becomes necessary that the signal device shall give an indication different from that given in the position to which it has been moved by the fluid-pressure mechanism, the said locking means are rendered ineffective, leaving the signal device free to be moved by its counterweight, which is acted upon by gravity.

The means for locking the signal device in the position to which it has been moved by the fluid-pressure mechanism are here shown as comprising a fluid-pressure mechanism $D^2$ and a locking device C. The fluid-pressure mechanism $D^2$ is here shown as being in the form of a motor and comprising a diaphragm $d^7$, one side of which is acted upon by the fluid-pressure passing into a chamber $d^6$, containing the diaphragm, through the port $e^2$. The other side of the diaphragm is provided with a projection $d^8$, which actuates a lever $d^9$. The lever $d^9$ in turn actuates a rod $d^{10}$, one end of which is connected with the lever $d^9$, the other end being connected with a part comprised in the locking device.

C designates the locking device, and, as here shown, it comprises a pawl $c^3$ and a lever $c^4$ in the form of a bell-crank, which engages the pawl $c^3$. The pawl $c^3$ is pivoted at one of its ends on a pin $c^{12}$, carried in a yoke portion $c$, formed in the rod B, preferably at its lower end, and the pawl is provided with a toe portion $c^{13}$, which is adapted to engage the lever $c^4$. The lever $c^4$ is pivoted on a pin $c^2$, the ends of which are suitably held in some fixed part of the railway-signal—as, for example, the casing C'. The lever $c^4$ is also provided with a roller $c^5$, suitably journaled in the lever and with which the pawl $c^3$ engages, and with a stop $c^6$, here shown as being the end of the lever which abuts against the rod B or the casing C' to limit the movement of the lever in one direction. The lever $c^4$ is moved on its pivot in one direction through the agency of the rod $d^{10}$. The side members of the yoke $c$ are provided with longitudinally-extending slots $c'$, through which the pin $c^2$ extends. These slots permit of the rod B and its connections moving independently of the pin $c^2$ and the lever $c^4$. The effective position of the locking device C is shown in Fig. 1. In this position the rod B, the yoke $c$, and the pawl $c^3$ under the influence of the counterweight $a'$ act downwardly to restore the piston $d$ to the bottom of the cylinder. Such action, however, is prevented by the lever $c^4$, which is engaged by the pawl through the roller $c^5$ so long as pressure exists under the diaphragm. By reason of the relation of the journal of the roller $c^5$ to the pivots $c^{12}$ $c^2$, it lying outside of a line drawn through the pivots $c^{12}$ $c^2$, the weight of the signal and connected parts (rod B, &c.) is transmitted through the pawl $c^3$ to the periphery of the roller $c^5$ and through its journal to the center $c^2$ of the lever $c^4$ and tends to force the lever $c^4$ outward on its center $c^2$ and also to force the pawl $c^3$ outward with the lever $c^4$ to bring the toe portion $c^{13}$ into engagement with the lever $c^4$. The pawl $c^3$, the roller $c^5$ and its journal, and the lever $c^4$ form, in effect, a toggle-joint. When the pressure is relieved from under the diaphragm, the lever $c^4$ moves outward on its pivot $c^2$ and with the pawl $c^3$, thus bringing the toe portion $c^{13}$ against the lever $c^4$. In consequence of this the roller $c^5$ is moved from under the pawl and revolves on its journal and ceases to support the pawl, which swinging clear of the lever $c^4$ and roller $c^5$ descends with the rods B, the latter forcing the piston to the bottom of the cylinder. The parts are then in the position shown in Fig. 2, and the signal device is in the horizontal or danger position of indication. When fluid-pressure is again admitted under the diaphragm and to the cylinder $d'$, the roller $c^5$ is again moved to the position shown in Fig. 1, the stop $c^6$ limiting its movement. The piston moves the rod B upward and with it the pawl $c^3$, which moves past the roller and is afterward moved over the roller by the spring $c^9$. At about this time the fluid-pressure is cut off from the cylinder, but maintained under the diaphragm. The pressure being removed from under the piston, the parts moved by the piston settle down and finally assume the position shown in Fig. 1.

In order to provide for cutting off the supply of fluid-pressure to the fluid-pressure mechanism D after it has moved the signal device to the clear position of indication, so that it is or may be locked, I preferably provide means for mechanically operating the valve $f$, the said means being positively operated from some part comprised in the railway-signal, which part has a movement coincident with the movement of the signal device. As shown in the drawings, the valve $f$, which controls the supply of fluid-pressure to the fluid-pressure mechanism, is of two parts. One of the parts $f'$ is adapted to control the escape of fluid-pressure from the mechanism D to the atmosphere through a port or passage $e^{11}$. It will be observed that when the supply of fluid-pressure is opened to the mechanism (see Fig. 2) the upper part $f'$ of the valve is seated, so that no pressure can escape to the atmosphere; but when the fluid-pressure supply is cut off the upper part of the valve is unseated, (see Fig. 1,) so that the fluid-pressure in the mechanism may escape. This port also permits of air at atmospheric pressure remaining in the cylinder, which air acts as a cushion for the descending piston. The valve $f$ is provided with a stem $f^2$, which passes through a stuffing-box, and it is connected at its upper end by a pin $f^5$ to one end of a bell-crank lever $f^3$, which is pivoted on a pin $f^4$, mounted in some fixed part of the railway-signal—as, for example, the casing C'.

$f^6$ designates a spring-pressed pin or bolt, which is connected with the pin $f^5$ and serves to hold the bell-crank lever $f^3$ and the valve $f$ in the position to which they have been moved. The bell-crank lever is rocked on its pivot to shift the valve $f$ by means of a cam groove or slot $f^7$, provided in a motion-plate $f^8$, rigidly connected with the rod B by a bracket $f^9$ and moving in guides $f^{10}$. The walls $f^{11}$ $f^{12}$ of the middle portion of the groove or slot are the effective portions in the operation of the bell-crank lever, while the end portions $f^{13}$ $f^{14}$ are ineffective so far as imparting any movement to the bell-crank lever is concerned, but are effective for holding the bell-crank lever in the position to which it has been moved by either of the walls $f^{11}$ $f^{12}$ during and after the up-and-down movement of the motion-plate. It will be observed that the cam groove or slot between the walls $f^{11}$ $f^{12}$ is wider at that part than the remaining parts of the cam groove or slot. This is provided in order that the bell-crank lever be not rocked to open the valve by the wall $f^{11}$ when the rod B and pawl $c^3$ are settling down on the roller $c^5$ after the signal device has been moved to the clear position. It is at this time also that the spring pin or bolt $f^6$ is employed effectively in holding the bell-crank lever in position to have the valve $f$ closed against the fluid-pressure supply.

In Figs. 3 and 4 I have shown a modification of my invention, the modification residing mainly in the position of the fluid-pressure mechanism for operating the locking means, the locking means, and the means for mechanically operating the valve. The fluid-pressure mechanism $D^2$ is arranged beneath the piston of the fluid-pressure mechanism D, an advantage being a more compact construction. In the locking means the roller $c^5$ instead of being carried by the bell-crank lever $c^4$ is carried by the pawl $c^3$, and when the signal device is in the position indicating "clear" the roller $c^5$ seats in a pocket provided for it in the end of the lever $c^4$. The relative arrangements of the parts is the same as that shown in Figs. 1 and 2, and the operation is the same as that described in connection with Figs. 1 and 2.

The means for mechanically operating the valve $f$, which controls the supply of fluid-pressure to the fluid-pressure mechanism D and an exhaust therefrom, is here shown as comprising a lever $g$, pivoted upon a pin $g'$, secured in a bracket $g^2$, and a lever $g^3$, pivoted on a pin $g^4$, carried by the bracket $g^2$ and operated by a rod $g^5$, which is secured to the rod B, so that its motion will be coincident with that of the rod B. The lever $g$ is here shown as being in the shape of an elbow and as having a curved face $g^6$, along which a roller $g^7$ travels, the said roller $g^7$ being carried by the lever $g^3$. The lever $g$ is also provided with a straight face $g^8$, with which the roller $g^7$ also engages. As the lever $g^3$ is rocked on its pivot $g^4$ the roller $g^7$, traveling along the straight face $g^8$ of the lever $g$, will cause the lever to be rocked downward on its pivot $g'$. The continued downward movement of the roller $g^7$ brings it into engagement with the curved surface $g^6$, which will then be in such a position as to be concentric with the pivot $g^4$. The movement, therefore, of the roller $g^7$ along the curved face $g^8$ will produce no movement of the lever $g$ on its pivot.

$g^9$ designates a spring secured to the lever $g$ and adapted to bear upon the end of the stem $f^2$ of the valve $f$.

$g^{11}$ designates a lever pivoted at $g^{12}$ to the bracket $g^2$ and provided with a shoulder portion $g^{13}$, with which the adjacent end of the lever $g$ is adapted to engage. A spring $g^{14}$ is connected to the levers $g$ $g^{11}$, the tendency of which is to draw these levers toward each other. When the lever $g$ is moved downward on its pivot $g'$ by the roller $g^7$, moving under the influence of the rod $g^5$, the end of the lever $g$, swinging outward from under the lever $g^{11}$, permits of the lever $g^{11}$ being drawn downward to have its shoulder end $g^{13}$ engage over the adjacent end of the lever $g$, and thus prevent a reverse movement of the lever $g$ under conditions to be hereinafter described. On the upward movement of the roller $g^7$ under the influence of the rod $g^5$, and as it reaches the end of its upward stroke it engages the lever $g^{11}$ to disengage it from the end of the lever $g$ and thereby permit the spring $g^{14}$ to move the lever $g$ inward against the roller $g^7$. During the upward movement of the lever $g^3$ the roller $g^7$ leaves the curved surface $g^6$ of the lever $g$ prior to its engagement with the lever $g^{11}$. Were it not for the engagement of the shoulder $g^{13}$ of the lever $g^{11}$ with the lever $g$ the latter would follow the roller continuously to the completion of its upward movement. Owing to the engagement of the shoulder $g^{13}$ with the lever $g$ at such times, the upward movement of the lever $g$ is prevented until the shoulder $g^{13}$ is disengaged from it by reason of the elevation of the lever $g^{11}$ by the roller $g^7$. The effect of this is to permit of a sudden movement of the lever $g$ and have a quick release of the valve-stem $f^2$ and valve $f'$ as well as a quick seating of the valve $f$. It will be observed that when the lever $g$ is moved downward the spring $g^9$, acting on the end of the stem $f^2$, moves the valve $f$ to open the supply of fluid-pressure through the port or passage $e^5$ to the fluid-pressure mechanism D, and when the lever $g$ is moved upward the valve $f$ moves to close the supply of fluid-pressure to the fluid-pressure mechanism, and it is also moved to open an exhaust-port $e^{11}$, through which the fluid-pressure in the fluid-pressure mechanism may escape to the atmosphere.

H designates a circuit-controlling or circuit-switching device, by means of which one or a number of circuits may be controlled. The circuit-controlling device is here shown as comprising a pair of oppositely-arranged spring-arms $h$, suitably secured on the bracket $g^2$ and with which a movable spring-arm $h'$ is adapted to alternately engage. The spring-arm $h'$ is carried by an extension $h^2$ of the lever $g^{11}$ and partakes of the movement of this lever. The movement of the extension $h^2$ on the lever $g^{11}$ to control the circuits is dependent for this movement in one direction upon the spring $g^{14}$ and its movement in the opposite direction upon the roller $g^7$. If desired to have this extension $h^2$ move positively in both directions by the lever $g^3$, an extension $g^{15}$ (see dotted lines, Figs. 3 and 4) may be provided. The extension $g^{15}$ will move the extension $h^2$ when the lever $g^3$ is moved in one direction, and the extension $h^2$ will be moved in an opposite direction by the roller $g^7$. There may be any number of the pairs of arms $h$ and a corresponding number of arms $h'$, the number being regulated by the number of circuits to be controlled.

In Figs 5 and 6 I have shown another modified means for moving the valve $f$. In this form of apparatus the movement of the valve $f$ is accomplished by means of a rod $i^2$, acting through a spring $i$, which when under compression exerts a greater force than that exerted by the spring $i'$ and the fluid-pressure which operates normally to move the valve $f$ to shut off the fluid-pressure. The rod $i^2$ has an annular shoulder portion $i^3$ and a hollow cylindrical portion $i^4$, which receives the stem $f^2$ of the valve $f$. The spring $i$ is confined to the hollow cylindrical portion $i^4$, between the end thereof and the end of the stem $f^2$. Vertical motion is imparted to the rod $i^2$ by means of a rod $i^5$, which is suitably connected to the rod B, the connection not being shown. As the end of the rod $i^5$ moves downward it engages the shoulder portion $i^3$ and forces the rod $i^2$ downward to compress the spring $i$, which in turn moves the stem $f^2$ downward to open the valve against the combined resistance of the spring $i'$ and the fluid-pressure, as shown in Fig. 6. $i^6$ $i^6$ designate a pair of levers pivoted at one of their ends on pins $i^7$, held in the casing $i^8$. Each lever $i^6$ is provided with a shoulder portion $i^9$, which when the rod $i^2$ is moved downward engages the shoulder portion $i^3$ on the rod $i^2$ to hold the rod $i^2$ in its lowermost position. The movement of the levers $i^6$ to engage the shoulder $i^3$ is obtained from the springs $i^{10}$, one being provided for each lever. Each lever $i^6$ is also provided with a shoulder portion $i^{11}$, which shoulder portions are engaged by an annular projection $i^{12}$, carried by the rod $i^5$. The shoulders $i^{11}$ are engaged by the annular projection $i^{12}$ when the rod $i^5$ is moved upward with the signal-rod B. Their engagement by the projection is such that the lever $i$ will be forced outward on its pivots, thereby disengaging their shoulders $i^9$ from the shoulder $i^3$ to permit the spring $i'$ and the fluid-pressure to seat the valve $f$. The rod $i^2$ in this form is the equivalent of the levers $f'$ and $g$.

In Figs. 7 and 8 I have shown still another modification of the means for operating the valve $f$. These means comprise, essentially, a bell-crank lever pivoted on the pin $k'$, mounted in the bracket $k^2$, and a catch $k^3$ for holding the bell-crank lever in a position to hold open the valve. The catch $k^3$ is operated to release the lever $k$ by an extension $k^4$, suitably connected to the rod B, the connection not being shown. The rod $k^4$ also engages an arm $k^5$ of the bell-crank lever $k$ to move the lever to open the valve and to the position in which the lever is engaged by the catch $k^3$. Mounted in the stuffing-box $k^6$, carried by the lever $k$, is a spring-actuated plunger $k^7$, which engages with the stem $f^2$ of the valve $f$. This device constitutes a resilient medium between the lever $k$ and the valve-stem $f^2$ to the end that excessive pressures on the valve-seat $f'$ may not occur should the rod $k^4$ be out of adjusment.

The operation of the railway-signal is as follows, assuming that the signal device is in a position indicating danger: When the magnet in the valve device is energized, the valve $d^2$ is opened and the exhaust-port $e^{12}$, through which fluid-pressure from the fluid-pressure mechanism $D^2$ escapes, closed. Fluid-pressure from the tank E or other supply will flow past the valve $d^2$ to the fluid-pressure mechanism $D^2$ and to the fluid-pressure mechanism D, past the valve $f$, which was opened when the signal device reached the horizontal position. The piston $d$ of the fluid-pressure mechanism then moves upward, carrying with it the rod B, the pawl $c^3$, and the part which operates the means for moving the valve $f$. When the pawl $c^3$ has moved into position, so that it may be engaged by the lever $c^4$, the means controlling the valve $f$ are operated or permitted to operate to close the valve $f$ to shut off the supply of fluid-pressure to the mechanism D and to open the exhaust port or passage $e^{11}$. The fluid-pressure being cut off from the fluid-pressure mechanism D, the piston $d$ thereof will move downward to have the pawl $c^3$ engage with the lever $c^4$, which being held from outward movement by the fluid-pressure in the fluid-pressure mechanism $D^2$ will hold the signal device in the clear or safety position. When it is desired to have the signal device assume the danger or caution position, the magnet in the valve device $D'$ is deënergized. When this is done, the valve $d^2$ operates to cut off the supply of fluid-pressure from both fluid-pressure mechanisms and at the same time opens the exhaust-port $e^{12}$ to permit the escape of fluid-pressure in the fluid-pressure mechanism $D^2$. The locking device C will now become ineffective to hold the signal device, and the signal device, moving by the force of gravity acting on the counterweight $a'$ moves to the danger or caution position. At the same time the piston and rod B move downward, and with them the part which operates the means for opening the valve $f$. As soon as the electromagnetic valve device $D'$ is again operated fluid-pressure will again be admitted to both fluid-pressure mechanisms $D^2$ and D.

In Fig. 1 I have diagrammatically illustrated a section of railroad-track T, the usual track-battery Z, and the track-relay R. The armature $r$ of the relay R controls a local circuit in which the electromagnetic valve device $D'$ is included. In some instances the relay $r$ is dispensed with, and the current from battery Z through the rails of the track is made to directly energize the magnet comprised in the valve device $D'$. It will be observed that when the track-battery Z is not shunted—as, for example, by a train or pair of wheels of a train—the local circuit will be closed and the magnet of the electromagnetic device will be energized to hold open its valve $d^2$ to admit fluid-pressure to both mechanisms, which, operating as hereinbefore described, will move and hold the signal device in its clear or safety position. As soon, however, as a train or pair of wheels enters the section of track T the local circuit will be opened, the magnet of the electromagnetic valve deënergized, and the valve $d^2$ operated to cut off the supply of fluid-pressure. The signal device will then move to the danger or caution position in the manner hereinbefore described and will remain in this position until the local circuit is again closed by the train passing off the track-section T.

What I claim as my invention is—

1. In a fluid-pressure mechanism, the combination of a motor operable by fluid-pressure, a diaphragm also operable by fluid-pressure, means operated by the diaphragm for locking the movable part of the motor in its advanced position, a valve mechanically operated from the movable part of the motor for controlling the supply of fluid-pressure to it, and means for controlling the supply of fluid-pressure to the diaphragm.

2. The combination in a railway-signal, of a signal device, a fluid-pressure mechanism operatively connected therewith for moving the signal device from one position of indication to another, a locking device for locking the signal device in the position to which it has been moved, a second fluid-pressure mechanism for operating the locking device, a fluid-pressure supply for the fluid-pressure mechanisms, a valve for controlling the supply of fluid-pressure to the fluid-pressure mechanisms, and a valve mechanically operated from the first-mentioned fluid-pressure mechanism for cutting off the supply of fluid-pressure to the fluid-pressure mechanism operatively connected with the signal device after it has moved the signal device.

3. The combination in a railway-signal, of a signal device, a fluid-pressure mechanism operatively connected therewith for moving the signal device from one position of indication to another, a locking device for locking the signal device in the position to which it has been moved, a second fluid-pressure mechanism for operating the locking device, a fluid-pressure supply for the fluid-pressure mechanisms, a valve for controlling the supply of fluid-pressure to the fluid-pressure mechanisms, and a valve mechanically operated from the first-mentioned fluid-pressure mechanism for cutting off the supply of fluid-pressure to the first-mentioned fluid-pressure mechanism after it has moved the signal device, and opening an exhaust to the atmosphere.

4. In a fluid-pressure mechanism, the combination of a motor operable by fluid-pressure, a diaphragm also operable by fluid-pressure, means operated by the diaphragm for locking the movable part of the motor in its advanced position, and an electrically-operated valve for controlling the supply of fluid-pressure.

5. In a railway-signal, the combination of a signal device, a fluid-pressure mechanism operatively connected with the signal device for moving it from one position of indication to another, a second fluid-pressure mechanism and means operated thereby for locking the signal device in the position to which it has been moved, mechanical means operated from the first-mentioned fluid-pressure mechanism for controlling the supply of fluid-pressure to it, and means under the control of a train for controlling the supply of fluid-pressure to both of said fluid-pressure mechanisms.

6. In a fluid-pressure mechanism, the combination of a motor, a valve for controlling the supply of fluid-pressure thereto and an exhaust therefrom and a single means operated from the motor for controlling said supply and exhaust, said means comprising a part connected with the motor and having a movement coincident therewith, and a second part moved by the first-mentioned part through a portion of the movement of the first part and coacting with the valve.

7. In a fluid-pressure mechanism, the combination of a motor, a valve for controlling the supply of fluid-pressure thereto and an exhaust therefrom and means operated from the motor for controlling said valve, said means comprising a part connected with the said motor and having a movement coincident therewith, a pivoted lever operated by said part and in operative relation to said valve, and a second lever for holding the first-mentioned lever in one of the positions to which it has been moved.

8. In a fluid-pressure mechanism, the combination of a motor, a valve for controlling the supply of fluid-pressure thereto and an exhaust therefrom, a pivoted lever in operative relation to said valve, a second pivoted lever in engagement with said first-mentioned lever for operating it, a latching-lever for said first-mentioned lever and a part connected with the motor for operating said second-mentioned lever.

9. The combination in a railway-signal, of a signal device, a fluid-pressure mechanism operatively connected therewith for moving it from one position of indication to another, a locking device for locking the signal device in the position to which it has been moved, a second fluid-pressure mechanism for operating the locking device, a fluid-pressure supply for the fluid-pressure mechanisms, a valve for controlling the supply of fluid-pressure to the fluid-pressure mechanisms, a valve for cutting off the supply of fluid-pressure to the fluid-pressure mechanism for moving the signal device after it has moved the signal device, and means operated from the last-mentioned fluid-pressure mechanism for moving said valve, said means comprising a part having a movement coincident with the movable part of the fluid-pressure mechanism, a pivoted lever in operative relation to the valve and operated by the said part which has a coincident movement with the movable part of the motor.

10. The combination in a railway-signal, of a signal device, a fluid-pressure mechanism operatively connected therewith for moving it from one position of indication to another, a locking device for locking the signal device in the position to which it has been moved, a second fluid-pressure mechanism for operating the locking device, a fluid-pressure supply for the fluid-pressure mechanisms, a valve for controlling the supply of fluid-pressure to the fluid-pressure mechanisms, a valve for cutting off the supply of fluid-pressure to the fluid-pressure mechanism for moving the signal device after it has moved the signal device, and means operated from the last-mentioned fluid-pressure mechanism for moving said valve, said means comprising a part having a movement coincident with the movement of the movable part of the fluid-pressure mechanism, a pivoted lever in operative relation to said valve and adapted to be operated by the said part at the end and at the beginning of its movement.

11. In a fluid-pressure mechanism, the combination of a motor operable by fluid-pressure, a diaphragm also operable by fluid-pressure, means operated by the diaphragm for locking the movable part of the motor in its advanced position, an electrically-operated valve for controlling the supply of fluid-pressure to the motor and diaphragm and a mechanically-operated valve for controlling the supply of fluid-pressure to the motor.

In testimony whereof I have signed my name to this specification in the presence of two subscribing witnesses.

JOHN PRESSLEY COLEMAN.

Witnesses:
W. L. McDANIEL,
GEO. E. CRUSE.